(12) United States Patent
Bertrand et al.

(10) Patent No.: US 11,753,174 B2
(45) Date of Patent: Sep. 12, 2023

(54) SYSTEMS AND METHODS FOR AIRCRAFT WING PLUG

(71) Applicant: Pratt & Whitney Canada Corp., Longueuil (CA)

(72) Inventors: Pierre Bertrand, Sherrington (CA); Jean Thomassin, Ste Julie (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 108 days.

(21) Appl. No.: 16/878,580

(22) Filed: May 19, 2020

(65) Prior Publication Data

US 2021/0362863 A1    Nov. 25, 2021

(51) Int. Cl.
*B64D 27/24* (2006.01)
*B64D 27/12* (2006.01)
*B64D 29/02* (2006.01)
*B64D 27/02* (2006.01)

(52) U.S. Cl.
CPC ............. *B64D 27/24* (2013.01); *B64D 27/12* (2013.01); *B64D 29/02* (2013.01); *B64D 2027/026* (2013.01)

(58) Field of Classification Search
CPC .. B64D 27/12; B64D 27/24; B64D 2027/026; B64D 29/02
See application file for complete search history.

(56) References Cited

U.S. PATENT DOCUMENTS

| 3,739,580 | A  | * | 6/1973  | Bland       | F02K 5/02 244/12.3 |
| 6,726,149 | B2 |   | 4/2004  | Wojciechowski | |
| 8,314,505 | B2 | * | 11/2012 | McLoughlin  | F02C 7/36 290/46 |
| 8,393,580 | B2 | * | 3/2013  | Droney      | B64C 7/02 244/62 |

(Continued)

FOREIGN PATENT DOCUMENTS

| CN | 210162240 U | 3/2020 |
| EP | 2581308 A2  | 4/2013 |
| EP | 3620386 A1  | 3/2020 |

OTHER PUBLICATIONS

Extended European Search Report dated Oct. 18, 2021, issued during the prosecution of European Patent Application No. EP 21174523.7, 8 pages.

*Primary Examiner* — Jason H Duger
(74) *Attorney, Agent, or Firm* — NORTON ROSE FULBRIGHT CANADA LLP

(57) ABSTRACT

The aircraft includes a fuselage and at least one wing extending from the fuselage. The wing includes first and second original portions and a plug portion positioned between the first and second original portions. A propulsion system is positioned on the at least one wing. The propulsion system includes at least one electric powerplant and at least one combustion powerplant. Each powerplant delivers power to a respective air mover for propelling the aircraft. The electric powerplant and/or the combustion powerplant is (Continued)

positioned outboard from the plug portion. A method for retrofitting an aircraft includes segmenting a wing of an aircraft into two original portions, positioning a plug portion between the two original portions, and connecting the plug portion to one of the two original portions, the first nacelle and/or the second nacelle.

19 Claims, 4 Drawing Sheets

(56) References Cited

U.S. PATENT DOCUMENTS

| | | |
|---|---|---|
| 8,660,712 B2 | 2/2014 | Grabowsky et al. |
| 10,196,143 B2 * | 2/2019 | Quinlan .................. B64D 5/00 |
| 10,875,642 B2 * | 12/2020 | Kita ....................... B64D 27/02 |
| 11,174,035 B2 * | 11/2021 | Tamada ................. B64D 27/10 |
| 2003/0222170 A1 * | 12/2003 | Wojciechowski ........ B64C 3/00 |
| | | 244/10 |
| 2008/0149758 A1 | 6/2008 | Colgren et al. |
| 2016/0297520 A1 * | 10/2016 | Sada-Salinas ...... B64C 29/0025 |
| 2016/0355272 A1 | 12/2016 | Moxon |
| 2018/0230844 A1 * | 8/2018 | Vondrell ................. F01D 15/10 |
| 2019/0002117 A1 * | 1/2019 | Gansler .................. B60L 50/16 |

\* cited by examiner

SYSTEMS AND METHODS FOR AIRCRAFT WING PLUG

BACKGROUND OF THE INVENTION

1. Field of the Invention

The subject invention is directed to propulsion configurations in aircraft, and more particularly to propulsion configurations for an aircraft having mixed drive systems, including hybrid-electric propulsion systems.

2. Description of Related Art

The level of air traffic continues to increase worldwide, leading to increased fuel consumption and air pollution. Consequently, efforts are underway to make aircraft more environmentally compatible through the use of specific types of fuel and/or by reducing fuel consumption through the use of more efficient drive systems.

For example, aircraft having mixed drive systems that include a combination of various types of engines are known for reducing pollutants and increasing efficiency. Some current combinations include reciprocating engines and jet engines, reciprocating engines and rocket engines, jet engines and rocket engines, or turbojet engines and ramjet engines.

While these mixed drive systems are useful, they are not readily adaptable for use on commercial passenger aircraft. However, hybrid-electric propulsion systems that provide power through a combustion engine and an electric motor are indeed adaptable for use with commercial passenger aircraft and can provide efficiency benefits including reduced fuel consumption. The subject invention is directed to aircraft having such propulsion systems.

SUMMARY OF THE DISCLOSURE

The subject invention is directed to an aircraft. The aircraft includes a fuselage and at least one wing extending from the fuselage. The wing includes first and second original portions and a plug portion positioned between the first and second original portions. A propulsion system is positioned on the at least one wing. The propulsion system includes at least one electric powerplant and at least one combustion powerplant. Each powerplant delivers power to a respective air mover for propelling the aircraft. At least one of the electric powerplant or the combustion powerplant is positioned outboard from the plug portion.

In some embodiments, the electric powerplant is positioned outboard from the plug portion. The combustion powerplant can be positioned inboard from the plug portion. A length of the plug portion can be greater than a combined length of a first propeller blade operatively connected to the air mover of the electric powerplant and a second propeller blade operatively connected to the air mover of the combustion powerplant. The combustion powerplant can include a heat engine. The heat engine can be a gas turbine, a rotary engine or a reciprocating engine of any fuel type with a configuration of turbomachiney elements, selected from the group consisting of a turbocharger, turbosupercharger or supercharger and exhaust recovery turbo compounding, that is mechanically, electrically, hydraulically or pneumatically driven. An inner nacelle can be positioned at an abutment of the first original portion and the plug portion. The inner nacelle can house a heat engine of the combustion powerplant. An outer nacelle can be positioned at an abutment of the second original portion and the plug portion. The outer nacelle can house the electric motor of the electric powerplant. Batteries can be positioned out board of the plug portion.

In accordance with another aspect, a hybrid-electric aircraft includes a fuselage, at least one wing extending from the fuselage. The wing includes first and second original portions and a plug portion positioned between the first and second original portions. A propulsion system positioned on the at least one wing. The propulsion system includes at least one combustion powerplant and at least one hybrid-electric powerplant. Each powerplant delivers power to a respective air mover for propelling the aircraft. The hybrid-electric powerplant includes a heat engine and an electric motor arranged in a parallel drive configuration or in an in-line drive configuration. At least one of the combustion powerplant and the hybrid-electric powerplant is positioned outboard from the plug portion.

In some embodiments, the hybrid-electric powerplant is positioned outboard from the plug portion. The combustion powerplant can be positioned inboard from the plug portion. The heat engine of the hybrid-electric powerplant can be a gas turbine, a rotary engine or a reciprocating engine of any fuel type with a configuration of turbomachiney elements, selected from the group consisting of a turbocharger, turbosupercharger or supercharger and exhaust recovery turbo compounding, that is mechanically, electrically, hydraulically or pneumatically driven. An inner nacelle can be positioned at an abutment of the first original portion and the plug portion. The inner nacelle can house the combustion powerplant. An outer nacelle can be positioned at an abutment of the second original portion and the plug portion. The outer nacelle can house the hybrid-electric powerplant. A length of the plug portion can be greater than a combined length of a first propeller blade operatively connected to the air mover of the hybrid-electric powerplant and a second propeller blade operatively connected to the air mover of the combustion powerplant. Batteries can be positioned out board of the plug portion.

In accordance with another aspect, a method for retrofitting an aircraft includes segmenting a wing of an aircraft into two original portions, and positioning a plug portion between the two original portions such that a first nacelle is positioned on an inboard side of the plug portion and a second nacelle is positioned on an outboard side of the plug portion. The method includes connecting the plug portion to at least one of the two original portions, the first nacelle and the second nacelle.

The method can include connecting the second nacelle to the plug portion prior to connecting the plug portion to the two original portions. The method can include mounting at least a portion of an electric powerplant with the second nacelle. The method can include mounting at least a portion of a combustion powerplant with the first nacelle.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those having ordinary skill in the art will readily understand how to make and use the subject invention without undue experimentation, preferred embodiments thereof will be described in detail herein below with reference to the figures wherein.

DETAILED DESCRIPTION OF THE PREFERRED EMBODIMENTS

Figure 2:
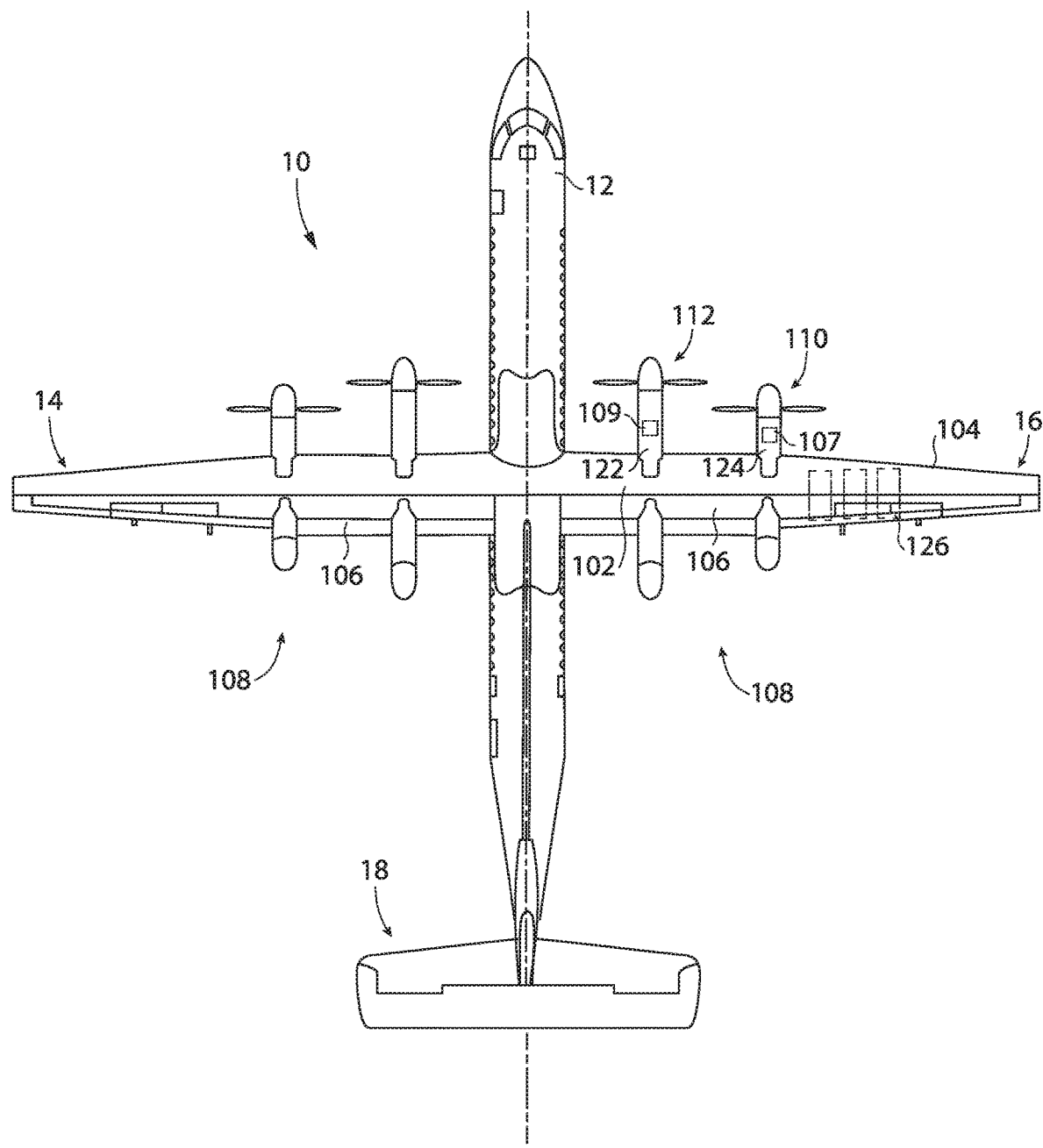
FIG. 2 is a schematic top plan view of a commercial passenger aircraft constructed in accordance with an embodiment of the present disclosure, showing each wing having a plug portion.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 2. Other embodiments of systems in accordance with the disclosure, or aspects thereof, are provided in FIGS. 3-5, as will be described. The systems and methods described herein can be used to provide aircraft with increased fuel efficiency. In traditional aircraft, for example the Dash 8-Q400, the wingspan is sized to accommodate faster take-off, climb and cruise speeds. One component to achieve increased fuel efficiency is flying slower in certain situations, which means a longer wing span may be required to obtain the necessary lift and lower induced drag. The present disclosures provides mechanisms for achieving the longer desired wingspan by modifying an existing aircraft.

Figure 1:
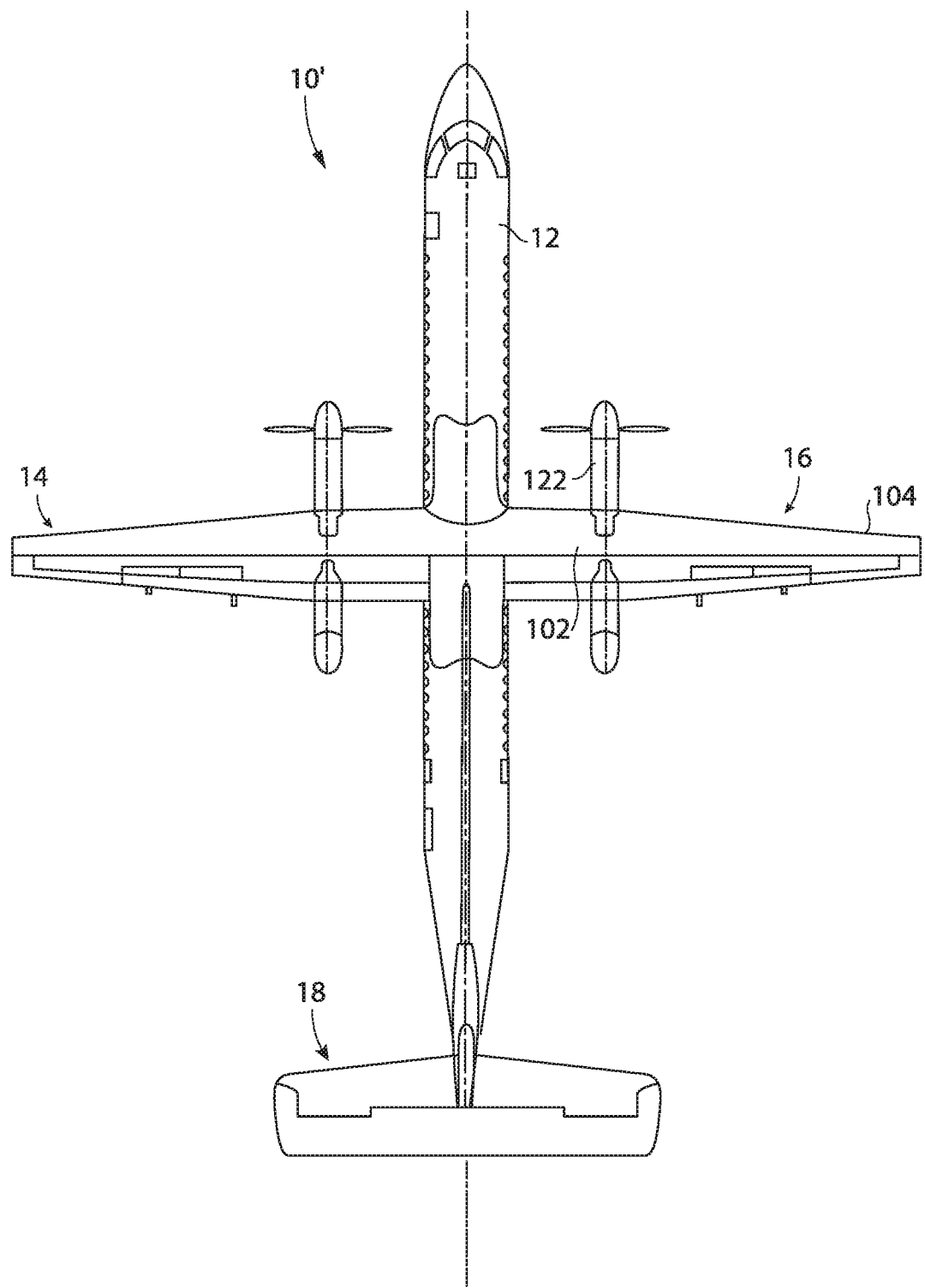
FIG. 1 is a schematic top plan view of a traditional commercial passenger aircraft.

Referring now to the drawings wherein like reference numerals identify similar structures or features of the subject invention, there illustrated in FIG. 1 a traditional commercial passenger aircraft 10' (or portions thereof) that includes a fuselage 12, left and right wings 14 and 16 and a tail section 18. Each wing 14 and 16 includes first and second original portions 102 and 104, respectively. In FIGS. 2-5, commercial passenger aircraft 10' has been modified in accordance with embodiments of the present disclosure to commercial passenger aircraft 10 having a plug portion 106, e.g. an e-wing plug, positioned between the first and second original portions 102 and 104. Each plug portion 106 includes leading and trailing edges 150 and 152, respectively. Leading and trailing edges 150 and 152 are substantially parallel to one another (as viewed from the top) to match a width of first portion 102 to accommodate easier attachment between first and second portions 102 and 104. Commercial passenger aircraft 10 of FIGS. 2-5 is the same as aircraft 10' except for the inclusion of plug portions 106, additional nacelles 124, and propulsion systems 108 and the various components thereof, each of which will be described in more detail below.

Figure 3:
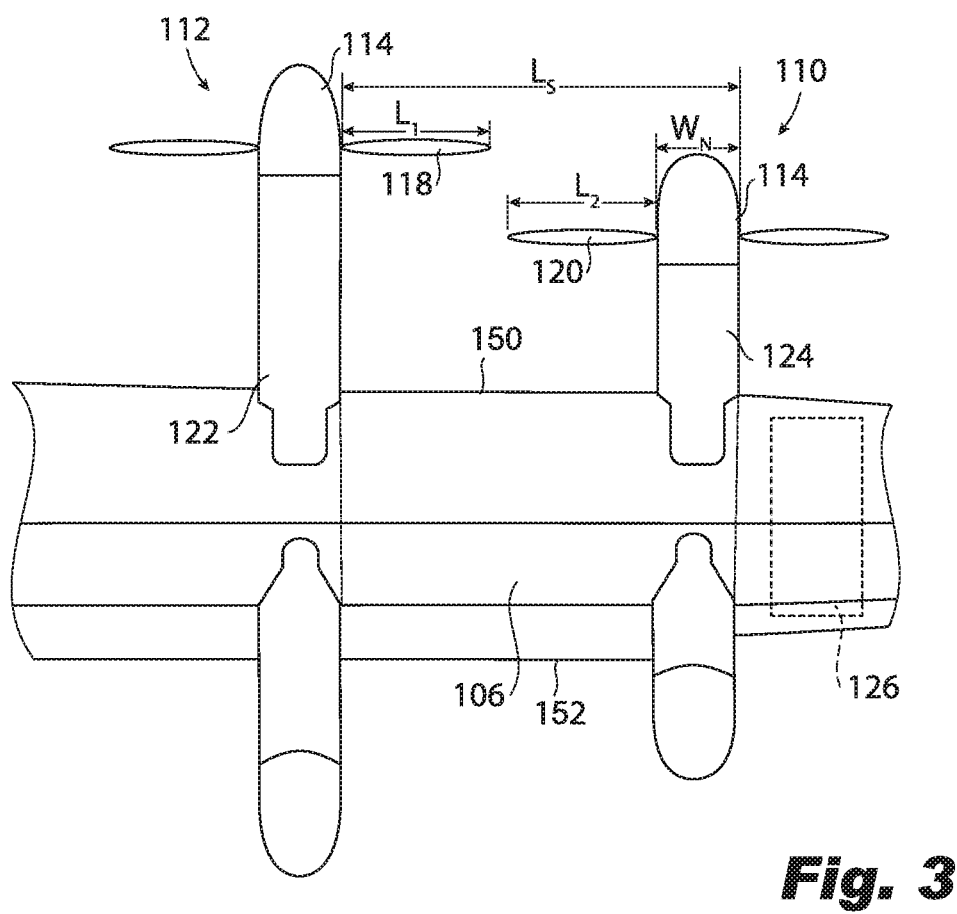
FIG. 3 is a schematic top plan view of a portion of one of the wings of the commercial passenger aircraft of FIG. 2, showing the length of the plug portion.
Figure 4:
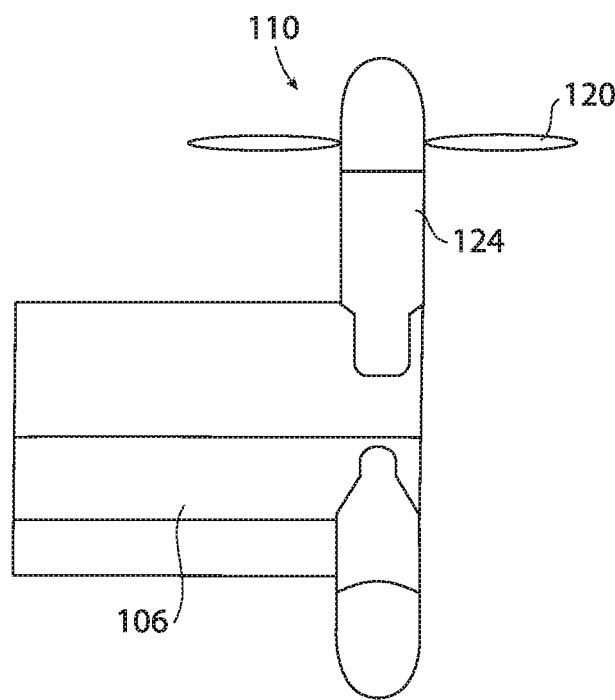
FIG. 4 is a schematic top plan view of the plug portion of the commercial passenger aircraft of FIG. 2, showing the outer nacelle operatively connected thereto.

In FIGS. 2-3, a propulsion system 108 is a distributed hybrid-electric propulsion system positioned on each wing 16 and 14. Each propulsion system 108 includes at least one electric powerplant 110 and at least one combustion powerplant 112. For sake of simplicity, only the propulsion system 108 for wing 16 is labeled fully. However, it will be readily appreciated that wing 14 would have a similar arrangement. Electric powerplant 110 delivers power to a respective air mover 114, e.g. propeller, fan or the like, for propelling the aircraft. The electric powerplant 110 includes a motor controller operatively connected to the e-motor, batteries, various power conversion electronics and the like. Combustion powerplant 112 delivers power to a second air mover 116, e.g. propeller, fan or the like, for propelling the aircraft. Electric powerplant 110 is positioned outboard from the plug portion 106. Batteries 126 to supply power to electric powerplant 110, or to receive power therefrom, are also positioned outboard of the plug portion 106, in original portion 104. The combustion powerplant 112 and its associated heat engine 109 is positioned inboard from the plug portion 106. In the embodiment of FIG. 3, the bounds of plug portion 106 are shown schematically by the vertically extending broken lines.

Those skilled in the art will readily appreciate that the heat engine 109 is a gas turbine, a rotary engine or a reciprocating engine of any fuel type with a configuration of turbomachiney elements, selected from the group consisting of a turbocharger, turbosupercharger or supercharger and exhaust recovery turbo compounding, that is mechanically, electrically, hydraulically or pneumatically driven. The electric powerplant 110 includes a structure integrated battery electric power control, an eMotor/generator, and wiring. The fuel tanks can also be positioned inboard from the plug portion 106. In some embodiments, it is also contemplated that the combustion powerplant 112 is positioned outboard from the plug portion 106, while the electric powerplant 110 is positioned inboard from the plug portion 106. In other words, their positions in FIGS. 2-4 would be swapped. In that scenario, the batteries 126 are positioned in-board of the plug portion 106.

As shown in FIG. 3, a length $L_s$ of the plug portion 106 is greater than length $L_1$ of a first propeller blade 118, length $L_2$ of a second propeller blade 120, and width $W_N$ of an outer nacelle 124. First propeller blade 118 is operatively connected to the air mover 114 of the combustion powerplant 112 and the second propeller blade 120 is operatively connected to the air mover 114 of the electric powerplant 110. An inner nacelle 122 is positioned at an abutment of the first original portion 102 and the plug portion 106. Those skilled in the art will readily appreciate that, while the plug portion 106 is shown as beginning at the outer edge of inner nacelle 122 and extending to the outer edge of outer nacelle 124, it is contemplated that plug portion can reside between the two nacelle centerlines or between other portions of the nacelle boundaries. The inner nacelle 122 houses a heat engine 109 of the combustion powerplant 112. An outer nacelle 124 is positioned at an abutment of the second original portion 104 and the plug portion 106. The outer nacelle 124 houses the electric motor 107 of the electric powerplant 110. Batteries 126 are positioned out board of the plug portion 106. The distributed parallel hybrid configuration with the plug portion 106 and increased wing span size results in a reduction in horsepower requirements of approximately 30% relative to similar baseline aircraft 10' with shorter wings and non-hybrid configuration. It is contemplated that the reduction in horsepower will vary depending on the baseline aircraft and size of the plug portion.

Figure 5:
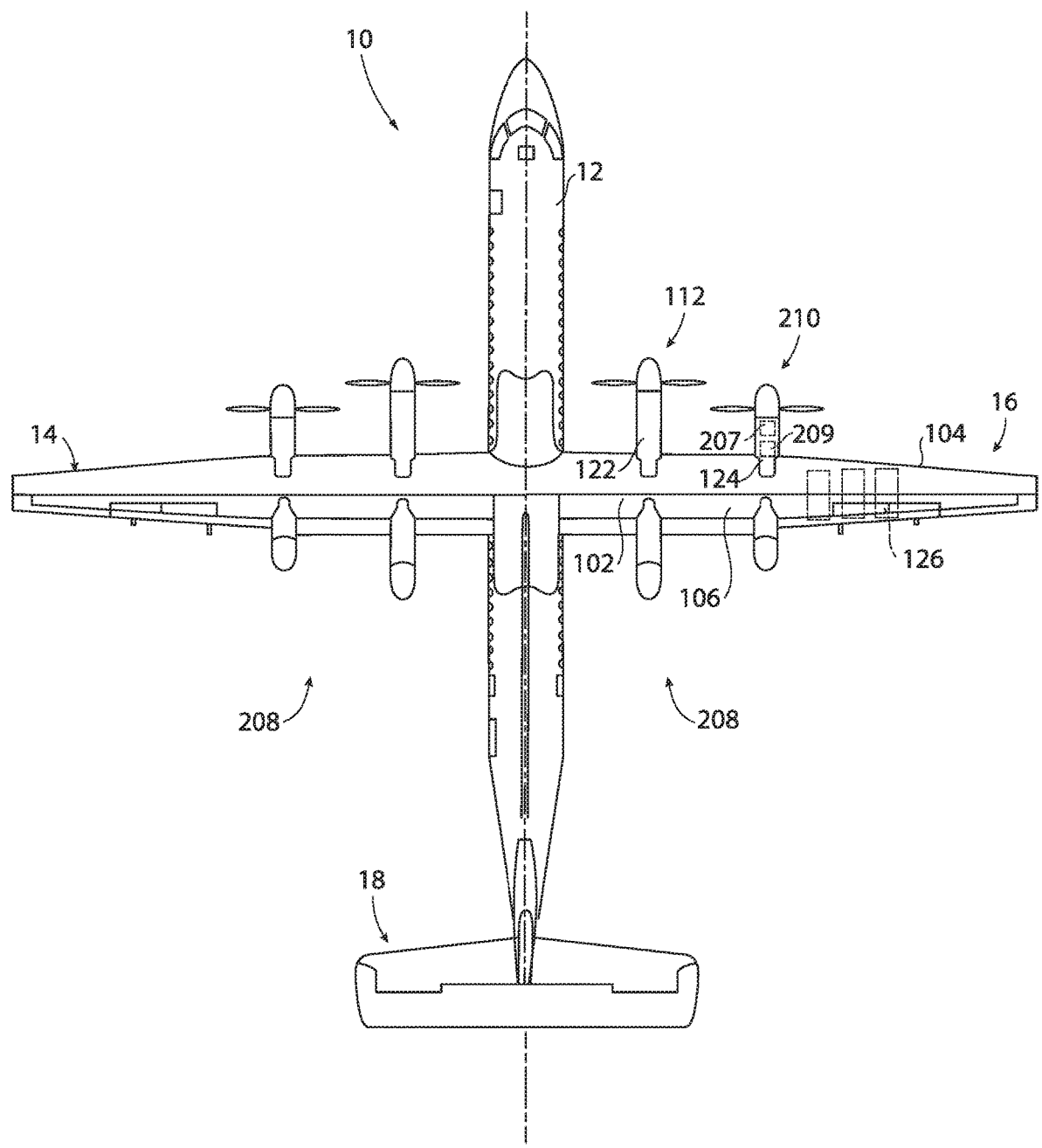
FIG. 5 is a schematic top plan view of a commercial passenger aircraft constructed in accordance with another embodiment of the present disclosure, showing each wing having a plug portion.

As shown in FIG. 5, in some embodiments the aircraft 10 is a hybrid-electric aircraft 10 similar to aircraft 10 of FIG. 2 above. Each wing 14 and 16 includes first and second original portions 102 and 104, the same as those of FIG. 2. In the aircraft 10 of FIG. 5, a propulsion system 208 is positioned on each wing 14 and includes at least one combustion powerplant 112, similar to propulsion system 108. Propulsion system 208 is slightly different from propulsion system 108 in that in includes at least one hybrid-electric powerplant 210. The hybrid-electric powerplant 210 includes a heat engine 209 and an electric motor 207 arranged in a parallel drive configuration or in an in-line drive configuration (schematically shown in FIG. 5). The hybrid-electric powerplant 210 is positioned outboard from the plug portion 106. The combustion powerplant 112 is positioned inboard from the plug portion 106. The heat engine 209 of the hybrid-electric powerplant 210 is similar to the heat engine 109 described above. An outer nacelle 124 positioned at an abutment of the second original portion 104 and the plug portion 106. The outer nacelle 124 houses the hybrid-electric powerplant 210. Similar to FIGS. 2-4, the length of the plug portion 106 is greater than length $L_1$ of a first propeller blade 118, length $L_2$ of a second propeller blade 120, and width $W_N$ of an outer nacelle 124. First propeller blade 118 is operatively connected to the air mover 114 of the combustion powerplant 112 and the second propeller blade 120 is operatively connected to the air mover 114 of the electric powerplant 110. The positioning of inner nacelle 122 and outer nacelles 124 is the same as that shown in FIG. 2. The increased wing span size operates to provide similar benefits as those describe above with respect to FIG. 2.

The methods and systems of the present disclosure, as described above and shown in the drawings provide for hybrid-electric systems that provide reduced fuel burn, e.g. by approximately 26% on a 250 nautical mile mission. Moreover, as battery technology improves, weight can be reduced to increase range and reduce fuel burn on shorter ranges, and/or more reliance can be put on electricity to reduce climb fuel, reduce cruise fuel. Even without battery technology improvements, the embodiments of the present disclosure assists in providing double digit fuel burn improvement on short routes. Other advantages of the embodiments of the present invention include reduction of $CO_2$ in the airport vicinity, and the reduction of the $CO_2$ by more than half during the takeoff phase due to the parallel hybrid configuration.

A method for retrofitting an aircraft, e.g. aircraft 10' of FIG. 1, includes segmenting a wing, e.g. wing 14 or 16, into two original portions, e.g. original portions 102 and 104, and positioning a plug portion, e.g. plug portion 106 of FIGS. 2-5, between the two original portions such that a first nacelle, e.g. nacelle 122, is positioned on an inboard side of the plug portion and a second nacelle, e.g. nacelle 124, is positioned on an outboard side of the plug portion. The method includes connecting the plug portion to at least one of the two original portions, the first nacelle and the second nacelle. The method includes connecting the second nacelle to the plug portion prior to connecting the plug portion to the two original portions. The method includes mounting at least a portion of a powerplant, e.g. electric powerplant 110 or hybrid-electric powerplant 210, with the second nacelle. The method includes mounting at least a portion of a combustion powerplant with the first nacelle. The plug portion can be constructed in a similar manner as the original portions (e.g. as an airfoil), and can similarly be constructed from the same materials, e.g. aluminum, titanium or the like. It is contemplated that the plug portion can be connected to the original portions through a variety of fastening means such as welding, mechanical fasteners or the like.

The methods and systems of the present disclosure, as described above and shown in the drawings, provide for reduced power requirements for combustion engines, resulting in increased efficiency and reduced pollution. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A passenger aircraft, comprising:
a fuselage extending along a central axis from a nose to a tail, the nose disposed forward of the tail, the fuselage configured for accommodating passengers;
at least one wing extending from the fuselage at an axial location between the nose and the tail, wherein the at least one wing includes first and second original portions and a plug portion positioned between the first and second original portions, wherein the plug portion includes a leading edge and a trailing edge, wherein the leading edge and the trailing edge of the plug portion are parallel to one another, wherein the second original portion has a leading edge and a trailing edge converging toward one another in a direction away from the central axis; and
a propulsion system positioned on the at least one wing, wherein the propulsion system includes at least one hybrid-electric powerplant and at least one combustion powerplant, wherein the at least one hybrid-electric powerplant and the at least one combustion powerplant respectively deliver power to a first air mover and a second air mover, the first and second air movers disposed forward of the leading edge of the plug portion and both having an axially facing orientation for propelling the aircraft in a forward direction, the hybrid-electric powerplant includes a heat engine and an electric motor arranged in a parallel drive configuration or in an in-line drive configuration, wherein at least one of the hybrid-electric powerplant or the combustion powerplant is positioned outboard from the plug portion.

2. The passenger aircraft as recited in claim 1, wherein the at least one hybrid-electric powerplant is positioned outboard from the plug portion.

3. The passenger aircraft as recited in claim 1, wherein the at least one combustion powerplant is positioned inboard from the plug portion.

4. The passenger aircraft as recited in claim 1, wherein a length of the plug portion is greater than a combined length of a first propeller blade operatively connected to the first air mover and a second propeller blade operatively connected to the second air mover.

5. The passenger aircraft as recited in claim 1, wherein the at least one combustion powerplant includes a heat engine, wherein the heat engine is a gas turbine, a rotary engine or a reciprocating engine of any fuel type with a configuration of turbomachinery elements, selected from the group consisting of a turbocharger, turbosupercharger or supercharger and exhaust recovery turbo compounding, that is mechanically, electrically, hydraulically or pneumatically driven.

6. The passenger aircraft as recited in claim 1, further comprising an inner nacelle positioned at an abutment of the first original portion and the plug portion, wherein the inner nacelle houses a heat engine of the at least one combustion powerplant.

7. The passenger aircraft as recited in claim 1, further comprising an outer nacelle positioned at an abutment of the second original portion and the plug portion, wherein the outer nacelle extends along an axis parallel to the central axis of the fuselage and houses the electric motor of the at least one hybrid-electric powerplant.

8. The passenger aircraft as recited in claim 1, further comprising batteries positioned outboard of the plug portion.

9. A hybrid-electric aircraft, comprising:
- a fuselage extending along a central axis, the fuselage configured to accommodate passengers;
- at least one wing extending from the fuselage, wherein the at least one wing includes first and second original portions and a plug portion positioned between the first and second original portions; wherein the plug portion includes a leading edge and a trailing edge, wherein the leading edge and the trailing edge are parallel to one another, wherein the second original portion has a leading edge and a trailing edge converging toward one another in a direction away from the central axis; and
- a propulsion system positioned on the at least one wing, wherein the propulsion system includes at least one combustion powerplant and at least one hybrid-electric powerplant, wherein the at least one combustion powerplant and the at least one hybrid-electric power plant respectively deliver power to a first air mover and a second air mover disposed forward of the leading edge of the plug portion, the first and second air movers having an axially facing orientation for propelling the aircraft, wherein the at least one hybrid-electric powerplant includes a heat engine and an electric motor arranged in a parallel drive configuration or in an in-line drive configuration, wherein at least one of the at least one combustion powerplant and the at least one hybrid-electric powerplant is positioned outboard from the plug portion; and
- an outer nacelle positioned at an abutment of the second original portion and the plug portion, wherein the outer nacelle has an axis parallel to the central axis of the fuselage and houses the hybrid-electric powerplant.

10. The hybrid-electric aircraft as recited in claim 9, wherein the at least one hybrid-electric powerplant is positioned outboard from the plug portion.

11. The hybrid-electric aircraft as recited in claim 9, wherein the at least one combustion powerplant is positioned inboard from the plug portion.

12. The hybrid-electric aircraft as recited in claim 9, wherein the heat engine of the at least one hybrid-electric powerplant is a gas turbine, a rotary engine or a reciprocating engine of any fuel type with a configuration of turbomachiney elements, selected from the group consisting of a turbocharger, turbosupercharger or supercharger and exhaust recovery turbo compounding, that is mechanically, electrically, hydraulically or pneumatically driven.

13. The hybrid-electric aircraft as recited in claim 9, further comprising an inner nacelle positioned at an abutment of the first original portion and the plug portion, wherein the inner nacelle houses the at least one combustion powerplant.

14. The hybrid-electric aircraft as recited in claim 9, wherein a length of the plug portion is greater than a combined length of a first propeller blade operatively connected to the first air mover and a second propeller blade operatively connected to the second air mover.

15. The hybrid-electric aircraft as recited in claim 9, further comprising batteries positioned outboard of the plug portion.

16. A method for retrofitting a passenger aircraft having a fuselage configured to accommodate passengers, the fuselage extending along a central axis, the method comprising:
- segmenting a wing of the passenger aircraft into a first and a second original portion;
- positioning a plug portion between the first and the second original portions, wherein the plug portion includes a leading edge and a trailing edge, wherein the leading edge and the trailing edge are parallel to one another, wherein the plug portion is positioned such that a first nacelle is positioned on an inboard side of the plug portion and a second nacelle is positioned on an outboard side of the plug portion, wherein the second original portion has a leading edge and a trailing edge converging toward one another in a direction away from the central axis, and wherein the first nacelle and the second nacelle have respective axes oriented parallel to the central axis of the fuselage, the first and second nacelles extending forwardly of the leading edge of the plug portion; and
- connecting the plug portion to the first nacelle, the second nacelle, and at least one of the first and the second original portions.

17. The method as recited in claim 16, further comprising connecting the second nacelle to the plug portion prior to connecting the plug portion to the at least one of the first and the second original portions.

18. The method as recited in claim 16, further comprising mounting at least a portion of an electric powerplant with the second nacelle.

19. The method as recited in claim 16, further comprising mounting at least a portion of a combustion powerplant with the first nacelle.

\* \* \* \* \*